US011794408B2

(12) United States Patent
Gaitonde

(10) Patent No.: US 11,794,408 B2
(45) Date of Patent: Oct. 24, 2023

(54) THREE-DIMENSIONAL PRINTING SYSTEMS WITH PLATE AND LIP GEOMETRIC FEATURES TO REDUCE MANUFACTURED OBJECT DEFECTS

(71) Applicant: 3D Systems, Inc., Rock Hill, SC (US)

(72) Inventor: Aalok Uday Gaitonde, West Lafayette, IN (US)

(73) Assignee: 3D SYSTEMS, INC., Rock Hill, SC (US)

( * ) Notice: Subject to any disclaimer, the term of this patent is extended or adjusted under 35 U.S.C. 154(b) by 0 days.

(21) Appl. No.: 17/173,233

(22) Filed: Feb. 11, 2021

(65) Prior Publication Data

US 2021/0252784 A1 Aug. 19, 2021

Related U.S. Application Data

(60) Provisional application No. 62/977,849, filed on Feb. 18, 2020.

(51) Int. Cl.
*B29C 64/25* (2017.01)
*B33Y 30/00* (2015.01)
*B29C 64/268* (2017.01)
*B29C 64/393* (2017.01)
*B33Y 50/02* (2015.01)

(52) U.S. Cl.
CPC .......... *B29C 64/25* (2017.08); *B29C 64/268* (2017.08); *B33Y 30/00* (2014.12); *B29C 64/393* (2017.08); *B33Y 50/02* (2014.12)

(58) Field of Classification Search
CPC ..... B29C 64/25; B29C 64/268; B29C 64/393; B29C 64/245; B29C 64/255; B33Y 30/00; B33Y 50/02
See application file for complete search history.

(56) References Cited

U.S. PATENT DOCUMENTS 508,494 A * 11/1893 West et al. ............ B29C 64/165
264/250
2007/0075461 A1* 4/2007 Hunter .................. B29C 64/245
425/174

(Continued)

FOREIGN PATENT DOCUMENTS

CN 109501250 * 3/2019
CN 109501250 A * 3/2019 ........... B29C 33/442

OTHER PUBLICATIONS

CN 109501250 translation (Year: 2023).*

*Primary Examiner* — Francisco W Tschen
*Assistant Examiner* — Guy F Mongelli

(57) ABSTRACT

A three-dimensional printing system includes a build vessel, a plate, a vertical movement mechanism coupled to the plate, a powder coater, an energy source, and a controller. The build vessel includes one or a plurality of vertical chamber walls. The vertical chamber wall(s) laterally enclose a build chamber and have inward facing surfaces that collectively define a lateral extent or width of the build chamber. The build vessel includes a lip that defines an upper surface of the build vessel. The lip extends inwardly from the inward facing surfaces to define an opening having a lateral extent that is smaller than the lateral extent of the build chamber. The plate has an upper surface and a lateral extent that is larger than the lateral extent of the opening. The plate laterally overlaps with the lip.

20 Claims, 4 Drawing Sheets

(56) References Cited

U.S. PATENT DOCUMENTS

| | | | |
|---|---|---|---|
| 2017/0173890 A1* | 6/2017 | Choi | B29C 64/112 |
| 2019/0118468 A1* | 4/2019 | Bobar | B22F 12/37 |
| 2019/0127114 A1* | 5/2019 | Livesley-James | B65D 77/2024 |
| 2019/0262900 A1* | 8/2019 | Karlsson | B22F 1/00 |
| 2020/0010788 A1* | 1/2020 | Vellinger | B33Y 40/00 |
| 2020/0378067 A1* | 12/2020 | Brent, Jr. | B33Y 10/00 |

* cited by examiner

THREE-DIMENSIONAL PRINTING SYSTEMS WITH PLATE AND LIP GEOMETRIC FEATURES TO REDUCE MANUFACTURED OBJECT DEFECTS

CROSS-REFERENCE TO RELATED APPLICATIONS

This non-provisional patent application claims priority to U.S. Provisional Application Ser. No. 62/977,849, Entitled "THREE-DIMENSIONAL PRINTING SYSTEM WITH GEOMETRIC FEATURES TO REDUCE PERIPHERAL DEFECTS" by Aalok Uday Gaitonde, filed on Feb. 18, 2020, incorporated herein by reference under the benefit of U.S.C. 119(e).

FIELD OF THE INVENTION

The present disclosure concerns an apparatus and method for fabrication of solid three dimensional (3D) articles of manufacture from the selective fusion of powders. More particularly, the present invention concerns a new build vessel design to eliminate edge defects of a build volume.

BACKGROUND

Three dimensional (3D) printing systems are in rapidly increasing use for purposes such as prototyping and manufacturing. One type of 3D printer is often referred to as "selective laser sintering" in which layers of fusible polymer powder are dispensed and selectively fused together with a laser beam to form a three dimensional (3D) article of manufacture. Another type of printer for fusing polymer powder utilizes an inkjet printer to print a pattern of a radiation absorber and a radiation source to fuse the patterned powder.

The layers of polymer powder are alternately dispensed upon a plate and then selectively fused in a layer-by-layer manner. For some systems, a plurality of layers of unfused powder are dispensed before the selective fusion begins. A "build volume" of accumulating fused and unfused powder is contained within a build vessel defined by the plate and surrounding vertical sidewalls. The build volume is typically heated to a temperature just below a fusion temperature to facilitate the laser fusion. Before each layer of powder is dispensed, the plate is lowered by one layer thickness. Due to thermal expansion, the build volume of powder presses against the vertical sidewalls. The powder may sometimes stick to the sidewalls, causing defects that impact the quality and accuracy of the 3D article being fabricated.

SUMMARY

In a first aspect of the disclosure, a three-dimensional printing system includes a build vessel, a plate, a vertical movement mechanism coupled to the plate, a powder coater for dispensing layers of powder, an energy source for selectively fusing layers of the powder, and a controller. The build vessel includes one or a plurality of vertical vessel walls. The vertical vessel walls laterally enclose a build chamber and have inward facing surfaces that collectively define a lateral extent or width of the build chamber. The build vessel includes a lip that defines an upper surface of the build vessel. The lip extends inwardly from the inward facing surfaces to define an opening having a lateral extent that is smaller than the lateral extent of the build chamber. The plate has an upper surface and a lateral extent that is larger than the lateral extent of the opening. The plate laterally overlaps with the lip. In an illustrative embodiment, the energy source is a beam system. The controller is configured to operate the vertical movement mechanism, the powder coater, and the energy source to fabricate a three-dimensional article in a layer-by-layer manner. In some embodiments, the lip can extend inwardly from the inner surfaces of the vertical chamber walls fora lateral distance between 0.1 to 10 millimeters. In some more particular embodiments, the lip can extend inwardly from the inner surfaces of the vertical chamber walls for a lateral distance between 0.5 and 5 millimeters.

The lip reduces an area of a dispensed layer of powder upon the plate. When the system temperature is raised, thermal expansion of the powder therefore does not impinge as much on the inward facing surfaces. This reduces or eliminates a problem with powder sticking to the inward facing surface which can otherwise cause defects in a three-dimensional article being manufactured.

In one implementation, the plate defines an upper peripheral recess that receives the lip to allow the upper surface of the plate to be raised to be generally coplanar with an upper surface of the build vessel. The lip can take on any of a number of geometries that can include one or more of a rectangular vertical cross-section shape, an oblique lower surface, a horizontal lower surface, and an irregular lower surface.

In another implementation, the plate defines an upper peripheral recess that generally matches a geometry of the lip to allow the upper peripheral recess to closely receive the lip. Closely receiving means close without contact with a distance greater than mechanical tolerances. The lip can take on any of a number of geometries that can include one or more of a rectangular vertical cross-section shape, an oblique lower surface, a horizontal lower surface, and an irregular lower surface.

DETAILED DESCRIPTION OF THE PREFERRED EMBODIMENTS

Figure 1:
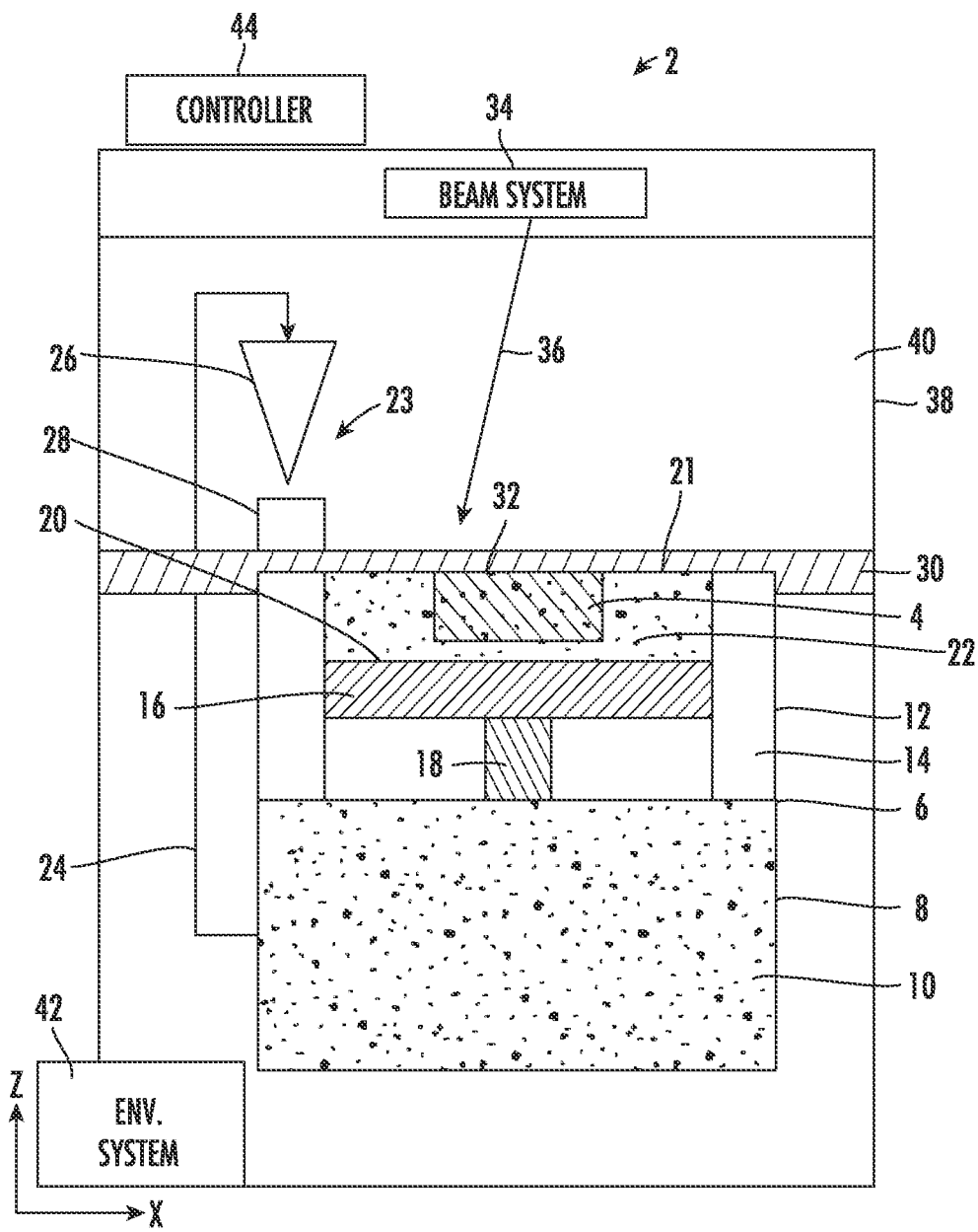
FIG. 1 is a schematic diagram of an embodiment of a three-dimensional printing system.

FIG. 1 is a schematic diagram of a three-dimensional printing system 2 for fabricating a three-dimensional article 4. In describing system 2, mutually perpendicular axes X, Y, and Z can be used. Axes X and Y are generally horizontal and are referred to as lateral axes X and Y. Axis Z is generally vertical and is referred to as vertical axis Z. By "generally" it is implied that a direction, orientation, dimension, shape, or distance is by design but may vary according to manufacturing tolerances or a surface upon which system 2 is disposed.

System 2 includes a build module 6. In the illustrated embodiment, build module 6 includes a lower powder storage vessel 8 storing powder 10. Module 6 has an upper build vessel 12 with vertical walls 14. Within the build vessel 12 is a build plate or platen 16 (hereafter referred to as plate 16) coupled to a vertical movement mechanism 18.

The plate 16 has an upper surface 20. A build volume 22 is bounded laterally and below by the vertical walls 14 and the plate 16. The build volume 22 includes unfused powder 10 and the article 4. In the illustrated embodiment, the build module 6 is removable and replaceable. While the illustrated embodiment shows the lower powder storage vessel 8 and upper build vessel 12 as one removable unit, it is to be understood that other designs may have these as separate modules that can be fixed or removable. In some designs, the powder storage vessel 8 can be located above or laterally relatively to the build vessel 12.

In the illustrated embodiment, a powder delivery subsystem 23 includes the powder storage vessel 8, a powder delivery conduit 24, a powder dispenser 26, a powder coater 28, and a horizontal mechanism 30. The horizontal mechanism 30 supports, guides, and moves the powder coater 28 laterally. "Operating powder coater" 28 can refer to operating the horizontal mechanism 30 and the powder coater 28 (and other portions of the powder delivery subsystem 23) as needed to translate the coater 28 and to dispense a layer of powder 10 defining a build plane 32. Build plane 32 is defined at an upper surface of a layer of powder 10 that has just been dispensed. Other designs of powder delivery subsystems 23 are possible.

An energy source 34 is configured to selectively fuse a layer of the powder 10. In the illustrated embodiment, the energy source 34 is a beam system 34 configured to generate and scan an energy beam 36 over a two dimensional pattern over the build plane 32 to selectively fuse a layer of powder 10. In an illustrative embodiment, the energy beam 36 is a laser beam 36 with an appropriate wavelength and power to fuse the powder 10. In an alternative embodiment the energy source 34 can include an inkjet printer and a radiation source. The inkjet printer selectively prints a radiation absorber onto the layer of powder 10. The radiation source emits radiation that is preferentially absorbed by the radiation absorber.

In the illustrated embodiment, the system 2 includes an outer housing 38 that defines an internal chamber 40. Chamber 40 contains the build module 6 and powder delivery subsystem 23. An environmental control system 42 is configured to maintain one or more environmental parameters (e.g., temperature, gaseous composition, etc.) within build vessel 12 and chamber 40. System 42 is configured to maintain an elevated temperature of the build volume 22 to facilitate sintering of layers of powder 10. System 42 can also include a vacuum system and a source of inert gas such as nitrogen or argon. In some embodiments, system 42 can evacuate ambient air from chamber 40 and backfill chamber 40 with the inert gas during operation.

A controller 44 is controllably coupled to the vertical movement mechanism 18, the powder delivery subsystem 23, the beam system 34, the environmental system 42, and other portions and sensors within the system 2. The controller 44 includes a processor coupled to an information storage device (e.g., memory device). The information storage device stores software instructions. When executed by the processor, the software instructions perform various functions that the controller 44 is configured to perform.

For manufacturing the article 4, in one embodiment of a manufacturing method the controller 44 is configured to: (1) operate the vertical movement mechanism 18 to position the upper surface 20 of the plate 16 proximate to the build plane 32, (2) operate the powder coater 28 to dispense a layer of powder 10, (3) operate the vertical movement mechanism 18 to position an upper surface 21 of the powder 10 proximate to the build plane 32, (4) operate the powder coater 28 to dispense a layer of powder 10 over the upper surface 21, (5) repeat (3) and (4) to build up an initial thickness of powder, (6) operate the vertical movement mechanism to position the upper surface 21 of the powder 10 proximate to build plane 32, (7) operate the powder coater 28 to dispense a layer of powder 10, the upper surface of which defines the build plane 32, (8) operate the energy source 34 to selectively fuse the just-dispensed layer of powder 10, and (9) repeat (6)-(8) until the three-dimensional article 4 is fully fabricated. In some embodiments, the initial thickness of powder can be about 13 millimeters. In other embodiments, the initial thickness can vary. In an alternative embodiment, solidification of the powder begins with a first layer of powder dispensed upon the plate 16.

The controller 44 is also configured to operate the environmental system 42 to maintain one or more environmental parameters within the system 2. This can include operating heaters that maintain a temperature of the build volume or chamber 22. This can also include operating gas handling equipment to control a gaseous environment within the chamber 40.

Figure 2:
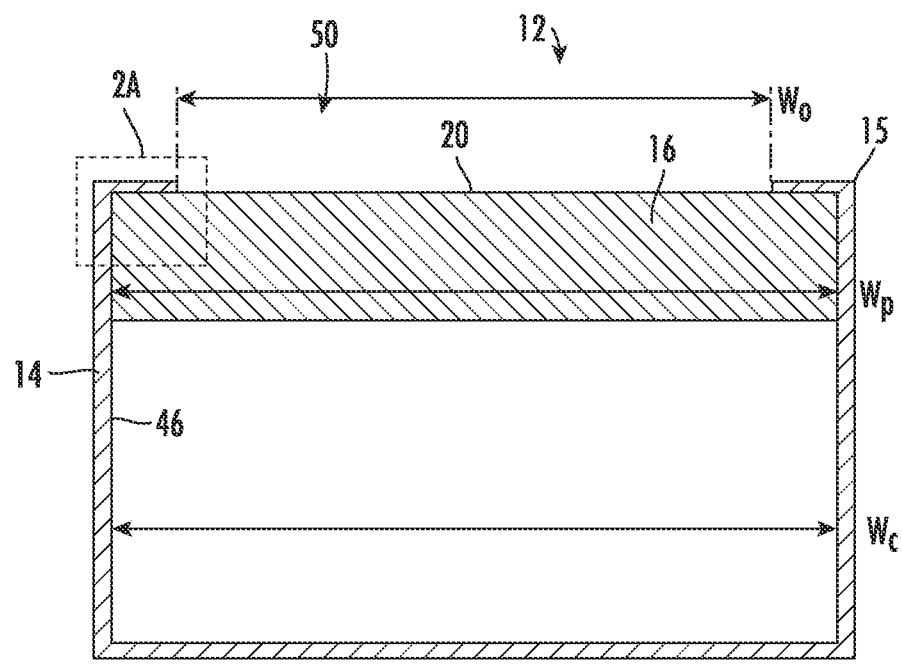
FIG. 2 is a first embodiment of a build vessel.
Figure 3:
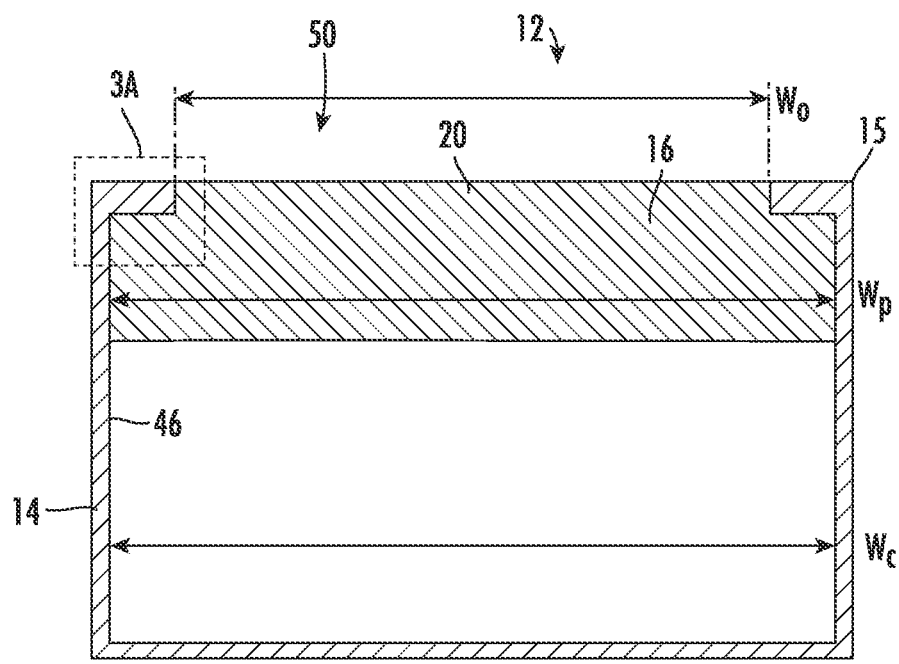
FIG. 3 is a second embodiment of a build vessel.
Figure 4:
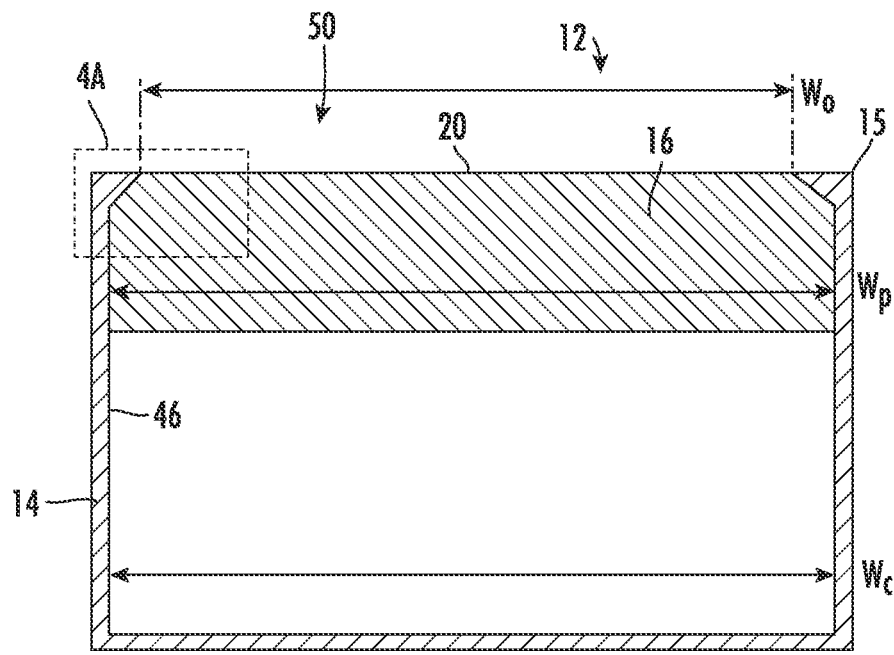
FIG. 4 is a third embodiment of a build vessel.

FIGS. 2-4 (including "detail A" drawings) are vertical cross-section schematic drawings illustrating three different embodiments of the build vessel 12. The build vessel 12 includes a lip 48 that defines an upper surface 49. FIGS. 2/2A, 3/3A, and 4/4A differ from each other in terms of the design of the lip 48. In FIGS. 2-4, the build vessel 12 can include an upper portion 15 that includes the lip 48 and is removable from the build vessel 12. Removing the upper portion 15 allows removal and replacement of the plate 16 from and to the build vessel 12. In some embodiments, the upper portion 15 is secured to the build vessel 12 with screws to allow the upper portion 15 to be unbolted and removed from the build vessel 12.

The build vessel 12 includes one or a plurality of vertical chamber walls 14. There would be one vertical wall 14 if the build vessel 12 has a circular or oval cross section, four vertical walls 14 if the build vessel 14 is square or rectangular, and more vertical walls if the build vessel 14 is a polygon with more than four sides. The vertical walls 14 laterally enclose the build chamber 22 (FIG. 1) and have inwardly facing surfaces 46 that collectively define a horizontal extent or width $W_C$ of the chamber 22. The plate 16 also has a maximum horizontal extent or width $W_P$ that is roughly equal to but just less than $W_C$ to allow the plate 16 translate vertically within the vertical walls 14.

Figure 2A:
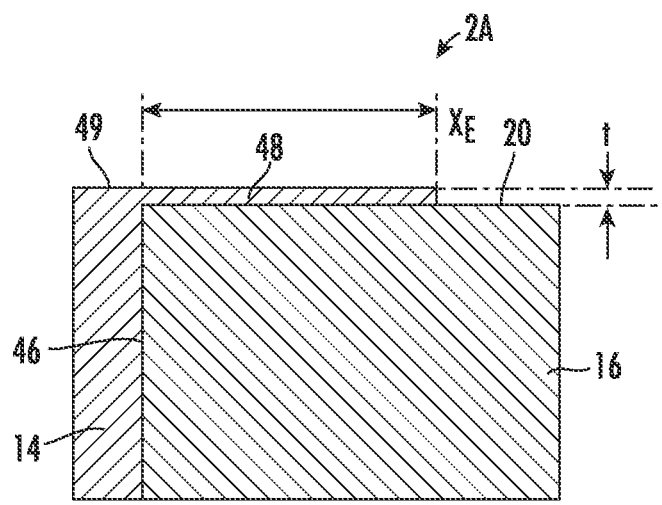
FIG. 2A is a detail 2A taken from FIG. 2.

FIG. 2 depicts a first embodiment of lip 48. FIG. 2A is detail 2A taken from FIG. 2. The lip 48 extends laterally away from the inward facing surface 46. The lip defines a distance $X_E$ in a direction that is perpendicular to surface 46. The distance $X_E$ can be referred to as a "lip overhang". The result is that an upper opening 50 of the build vessel 12 has an opening width or extent Wo which equals We minus 2 times $X_E$. As a result, when layers of powder 10 are dispensed above plate upper surface 20, there is less powder 10 deposited against the inner surfaces 46. In the illustrated first embodiment a thickness t of the lip 48 is typically quite thin and can be provided with sheet metal. The enables the upper surface 20 of plate 16 to be raised until it is proximate to or nearly coplanar with an upper surface 49 of the vertical wall 14. In some embodiments the plate 16 can include a thin peripheral recess 56 (FIG. 3A) that allows the upper surface 20 to be raised to be generally coplanar with upper surface 49.

Figure 3A:
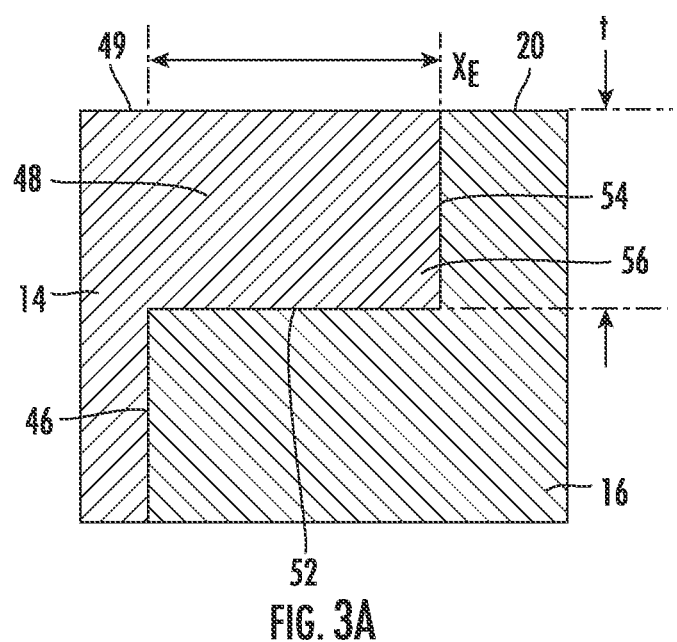
FIG. 3A is a detail 3A taken from FIG. 3.

FIG. 3 is a schematic drawing of a second embodiment of build vessel 12. Like numerals and symbols depict like or similar elements. FIG. 3A is detail 3A taken from FIG. 3. In the illustrated embodiment, the lip 48 has generally rectangular vertical cross-section shape. Lip 48 has an extension distance $X_E$ and thickness t. The plate 16 has a recessed upper peripheral surface 52 and a lateral upper wall 54 that together define a peripheral recess 56. In the illustrated embodiment, the peripheral recess 56 is rectangular and generally matches the geometry of lip 48. This allows the upper surface 20 of plate 16 to be raised up to be generally coplanar with the upper surface 49 of vertical wall 14. Thus, a vertical distance between the surfaces 20 and 52 are at least equal to t.

Figure 4A:
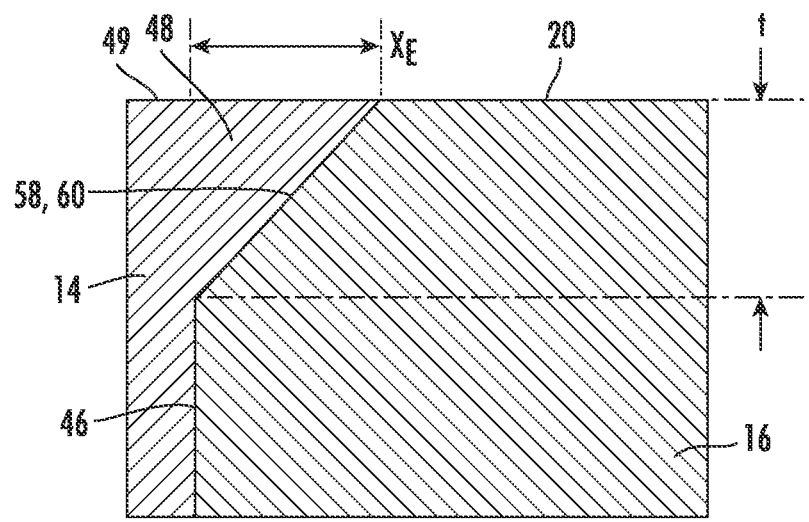
FIG. 4A is a detail 4A taken from FIG. 4.

FIG. 4 is a schematic drawing of a third embodiment of build vessel 12. Like numerals and symbols depict like or similar elements. FIG. 4A is detail 4A taken from FIG. 4. In the illustrated embodiment, the lip 48 has a triangular shape in a vertical plane and has an obliquely facing lower face 58. The extension distance is $X_E$ and thickness t. The plate 16 has a peripheral upper oblique surface 60 that generally matches surface 58. The geometry of surfaces 58 and 60 allow the upper surface 20 of plate 16 to be raised up to be generally coplanar with the upper surface 49 of vertical wall 14.

FIGS. 3 and 4 illustrate designs in which the inward extension 48 has a rectangular or triangular shape in a vertical cross-section respectively. It is to be understood that other geometries can be utilized. For example, lip 48 can include a generally rectangular portion and a generally triangular portion. As another example, lip 48 can have a lower surface with a curved and/or irregular shape.

A corresponding recess 56 in the plate 16 can have a sufficient geometry to allow surface 20 to be raised until is it coplanar with the upper surface 49 of vertical wall 14. The recess 56 does not always have to match the geometry of the lip 48 but would preferably contain the lip 48 to an extent to allow a general coplanarity of surfaces 20 and 49.

The specific embodiments and applications thereof described above are for illustrative purposes only and do not preclude modifications and variations encompassed by the scope of the following claims.

What is claimed:

1. A three-dimensional printing system configured to manufacture a three dimensional article in a layer by layer selective fusion of powder layers comprising:
   a build vessel including at least one vertical vessel wall laterally enclosing a build chamber and defining a lateral extent of the build chamber the build vessel including a lip that defines an upper surface of the build vessel, the lip extends inwardly from the at least one vertical vessel wall to define and enclose an opening having a lateral extent that is smaller than the lateral extent of the build chamber;
   a plate having an upper surface and a lateral extent that is larger than the lateral extent of the opening, the plate laterally overlaps with the lip over which a peripheral upper surface of the plate faces a lower surface of the lip, the lip is configured to reduce an area of dispensed powder upon the plate along a complete periphery of the plate;
   an energy source for selectively fusing the layers of the powder; and
   a controller configured to operate the three-dimensional printing system including operating the energy source to fabricate the three-dimensional article in a layer-by-layer manner.

2. The three-dimensional printing system of claim 1 wherein the lip extends inwardly from the at least one vertical vessel wall for a lateral distance between 0.1 to 10 millimeters.

3. The three-dimensional printing system of claim 1 wherein the lip extends inwardly from the at least one vertical vessel wall for a lateral distance between 0.5 to 5 millimeters.

4. The three-dimensional printing system of claim 1 wherein the controller includes a processor coupled to an information storage device storing software instructions, execution of the software instructions by the processor operates the three-dimensional printing system including operating the energy source.

5. The three-dimensional printing system of claim 1 wherein the plate defines an upper peripheral recess that receives the lip to allow the upper surface of the plate to be raised to be coplanar with an upper surface of the vertical vessel wall.

6. The three-dimensional printing system of claim 1 wherein plate defines an upper peripheral recess that allows the upper peripheral recess to receive the lip within the recess.

7. The three-dimensional printing system of claim 6 wherein the lip has defined a rectangular cross-section shape in a vertical plane, the plate includes a recess having a complementary rectangular cross-section.

8. The three-dimensional printing system of claim 6 wherein the lip has an oblique lower surface, the plate includes a complementary oblique peripheral upper surface that receives matches the oblique lower surface of the lip.

9. The three-dimensional printing system of claim 1 wherein the lip is defined by a metal sheet extending inwardly from the at least one vertical vessel wall.

10. The three-dimensional printing system of claim 1 wherein the lip defines a rectangular cross-section shape in a vertical plane, the plate includes a peripheral recess having a geometry to receive the lip to allow the upper surface of the plate to be raised to be coplanar with an upper surface of the vertical vessel wall.

11. The three-dimensional printing system of claim 10 wherein the peripheral recess has a rectangular cross-section shape in a vertical plane.

12. The three-dimensional printing system of claim 1 wherein the lip has an oblique lower surface, the plate includes a peripheral recess having a geometry to receive the lip to allow the upper surface of the plate to be raised to be coplanar with an upper surface of the vertical vessel wall.

13. The three-dimensional printing system of claim 12 wherein the peripheral recess has an oblique upper surface.

14. The three-dimensional printing system of claim 1 wherein the energy source is a beam system configured to generate and scan an energy beam.

15. A three-dimensional printing system configured to manufacture a three dimensional article in a layer by layer selective fusion of powder layers comprising:
   a build vessel including a plurality of vessel walls collectively and completely laterally enclosing a build chamber and defining a lateral extent of the build chamber, the build vessel including a lip that defines an upper surface of the build vessel, the lip extends inwardly from all of the plurality of vessel walls to define and completely laterally enclose an opening having a lateral extent that is smaller than the lateral extent of the build chamber;
   a plate having an upper surface and a lateral extent that is larger than the lateral extent of the opening, the plate laterally overlaps with the lip along all of the plurality of vessel walls, a peripheral upper surface of the plate faces the lip where the plate laterally overlaps the lip;

an energy source for selectively fusing the layers of the powder; and a controller configured to operate the three-dimensional printing system including operating the energy source to fabricate the three-dimensional article in a layer-by-layer manner, the controller includes a processor coupled to an information storage device storing software instructions, execution of the software instructions by the processor operates the three-dimensional printing system including operating the energy source.

16. The three-dimensional printing system of claim 15 wherein the lip extends inwardly from the at least one vertical vessel wall for a lateral distance between 0.5 to 5 millimeters.

17. The three-dimensional printing system of claim 15 wherein plate defines an upper peripheral recess that allows the upper peripheral recess to receive the lip within the recess.

18. The three-dimensional printing system of claim 17 wherein the lip has defines a rectangular cross-section shape in a vertical plane, the plate includes a recess having a complementary rectangular cross-section.

19. The three-dimensional printing system of claim 17 wherein the lip has an oblique lower surface, the plate includes a complementary oblique peripheral upper surface that receives and matches the oblique lower surface of the lip.

20. A three-dimensional printing system configured to manufacture a three dimensional article in a layer by layer selective fusion of powder layers comprising:

a build vessel including one or more vessel walls collectively completely laterally enclosing a build chamber and defining a lateral extent of the build chamber, the build vessel including a lip that defines an upper surface of the build vessel, the lip extends inwardly from the one or more vessel walls to define and completely laterally enclose an opening having a lateral extent that is smaller than the lateral extent of the build chamber;

a plate having an upper surface and a lateral extent that is larger than the lateral extent of the opening, the plate laterally overlaps with the lip on all sides of the build plate with a lateral overlap distance within a range of 0.1 to 10 millimeters and reduces an area of dispensed layer of powder upon the plate on all sides of the build plate, a peripheral upper surface of the plate faces the lip where the plate laterally overlaps the lip;

an energy source for selectively fusing the layers of the powder; and a controller configured to operate the three-dimensional printing system including operating the energy source to fabricate the three-dimensional article in a layer-by-layer manner, the controller includes a processor coupled to an information storage device storing software instructions, execution of the software instructions by the processor operates the three-dimensional printing system including operating the energy source.

* * * * *